(12) United States Patent
Motozawa et al.

(10) Patent No.: US 6,705,645 B2
(45) Date of Patent: Mar. 16, 2004

(54) VEHICLE OCCUPANT PROTECTION SYSTEM

(75) Inventors: Yasuki Motozawa, Tokyo (JP); Kazuya Yoshida, Tokyo (JP); Koji Sano, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/005,739

(22) Filed: Nov. 6, 2001

(65) Prior Publication Data

US 2002/0079689 A1 Jun. 27, 2002

(30) Foreign Application Priority Data

Nov. 6, 2000 (JP) .......................... 2000-337044
Nov. 6, 2000 (JP) .......................... 2000-337051

(51) Int. Cl.[7] .............................................. B60R 22/46
(52) U.S. Cl. ...................... 280/806; 180/268; 297/480
(58) Field of Search ............................... 280/806, 805, 280/808, 807; 297/480, 216.16, 216.15; 180/268, 282

(56) References Cited

U.S. PATENT DOCUMENTS

| | | | |
|---|---|---|---|
| 2,959,446 A | | 11/1960 | Thompson .................... 296/65 |
| 3,871,470 A | | 3/1975 | Schwanz et al. .............. 180/82 |
| 3,901,531 A | * | 8/1975 | Prochazka ................... 297/470 |
| 3,992,046 A | | 11/1976 | Braess ......................... 296/65 |
| 4,008,909 A | * | 2/1977 | Otani et al. .................. 297/470 |
| 5,533,756 A | * | 7/1996 | Dybro et al. ................. 280/806 |
| 5,552,986 A | | 9/1996 | Omura et al. ............ 364/424.05 |
| 5,607,185 A | * | 3/1997 | Isaji et al. ................... 280/806 |
| 5,785,347 A | | 7/1998 | Adolph et al. ............... 280/735 |
| 5,794,978 A | | 8/1998 | Nishide ....................... 280/806 |
| 5,984,357 A | | 11/1999 | Yasuda et al. ............... 280/806 |
| 6,145,881 A | * | 11/2000 | Miller et al. ................. 280/806 |
| 6,186,574 B1 | | 2/2001 | Motozawa et al. ......... 296/68.1 |
| 6,193,296 B1 | | 2/2001 | Motozawa et al. ......... 296/68.1 |
| 6,213,510 B1 | * | 4/2001 | Suyama ....................... 280/805 |
| 6,238,003 B1 | * | 5/2001 | Miller et al. ................. 297/480 |
| 6,332,629 B1 | * | 12/2001 | Midorikawa et al. ....... 280/806 |
| 6,513,880 B2 | * | 2/2003 | Yamaguchi et al. ......... 297/468 |

FOREIGN PATENT DOCUMENTS

| | | |
|---|---|---|
| JP | 7-101354 | 4/1995 |
| WO | WO 96/04154 | 2/1996 |
| WO | WO 99/62747 | 12/1999 |

OTHER PUBLICATIONS

U.S. application Ser. No. 09/608,669 filed Jun. 30, 2000, 22 pages.
U.S. application Ser. No. 09/648,190 filed Aug. 23, 2000, 21 pages.

* cited by examiner

Primary Examiner—Paul N. Dickson
Assistant Examiner—David R. Dunn
(74) Attorney, Agent, or Firm—MacPherson Kwok Chen & Heid LLP (57) ABSTRACT

In a vehicle occupant protection system comprising a seat for seating a vehicle occupant in a passenger compartment of a vehicle, and a seat belt for restraining a vehicle occupant seated in the seat, the seat belt is pulled rearward by a power actuator in an early stage of a vehicle crash to apply deceleration to the vehicle occupant before the vehicle body has started decelerating so that the vehicle occupant is prevented from being subjected to a deceleration level which is higher than an unacceptable level of deceleration throughout the entire period of the vehicle crash.

12 Claims, 5 Drawing Sheets

VEHICLE OCCUPANT PROTECTION SYSTEM

TECHNICAL FIELD

The present invention relates to a vehicle occupant protection system for protecting the vehicle occupant from the impact of a vehicle crash, and in particular to a vehicle occupant protection system which can favorably control the time history of the deceleration acting on the vehicle occupant at the time of a vehicle crash so as to minimize the injury to the vehicle occupant.

BACKGROUND OF THE INVENTION

When a vehicle frontally crashes onto a rigid body, because the seat belt inevitably has a certain slack and has a property to elongated under a tension, even though the vehicle occupant is restrained by the seat belt to a certain extent, the vehicle occupant continues to move forward under the inertia force. The forward movement of the vehicle occupant extends the seat belt, and the deceleration of the vehicle occupant peaks when the maximum extension of the seat belt has occurred. The peak of the deceleration of the vehicle occupant is normally greater than the peak of the deceleration of the vehicle body.

Normally, the extent of the injury to the vehicle occupant at the time of a vehicle crash is dictated by the maximum level of the deceleration of the vehicle occupant, and it is therefore desirable to reduce the maximum level of the deceleration of the vehicle occupant to as low a value as possible.

To minimize the deceleration of the vehicle occupant, it is necessary not only to reduce the average deceleration of the vehicle but also to control the deceleration pattern so as to reduce the elongation of the seat belt. To achieve this goal, it has been proposed to follow a pattern of deceleration in which a deceleration level higher than the average deceleration is produced in the vehicle seat in an early stage of the vehicle crash, and a deceleration in an opposite direction is produced in the vehicle seat for a short time period before the vehicle occupant is finally decelerated at the final steady deceleration of the vehicle body. For details of such earlier proposals, reference should be made to copending patent applications Ser. Nos. 09/648,190 filed Aug. 23, 2000, 09/608,669 filed Jun. 30, 2000, 09/377,366 filed Aug. 19, 1999, and 09/376,888 filed Aug. 18, 1999. The contents of these applications are hereby incorporated in this application by reference.

According to a conventional vehicle body structure (for instance, see Japanese patent laid open publication No. 07-101354), a crash reaction force generating member such as side beams and a crushable zone defined by the gaps between various components are placed in a front part of the vehicle body, and the deceleration pattern of the passenger compartment is controlled by absorbing the energy of the crash with the deformation of such parts. However, according to this prior proposal, it may be possible to control the deceleration level of the passenger compartment to a constant level (square wave), but a more effective deceleration pattern cannot be achieved.

BRIEF SUMMARY OF THE INVENTION

In view of such problems of the prior art and the recognition by the inventors, a primary object of the present invention is to provide a vehicle occupant protection system which can achieve a favorable deceleration pattern for the seat belt and thereby effectively reduce the maximum deceleration of the vehicle occupant.

A second object of the present invention is to provide a vehicle occupant protection system which is suitable for use in small cars where the permitted forward movement of the vehicle occupant at the time of a vehicle crash is relatively limited.

A third object of the present invention is to provide a vehicle occupant protection system which can minimize the injury to the vehicle occupant at the time of a vehicle crash under all conditions.

According to the present invention, these objects can be accomplished by providing a vehicle occupant protection system, comprising: a seat for seating a vehicle occupant in a passenger compartment of a vehicle body; a seat belt provided in association with the seat for restraining a vehicle occupant seated in the seat; a power actuator interposed between an end of the seat belt and a fixed part of the vehicle body and adapted to pull the seat belt in a direction to increase a restraint on the vehicle occupant; and a sensor for providing an activation signal to the power actuator upon detection of a vehicle crash; wherein the power actuator is adapted, when a vehicle crash is detected, to apply a rearward acceleration to the seat belt end in an early phase of the vehicle crash according to a prescribed pattern. Typically, the prescribed pattern includes an initial crash stage for moving the seat belt rearward at a deceleration which is earlier and greater than a deceleration produced in the vehicle body, and an intermediate crash stage for controlling the rearward movement of the seat belt so as to substantially equalize the deceleration acting on the vehicle occupant with the deceleration acting on the vehicle body.

When a vehicle crashes frontally onto an object, the front part readily deforms as it consists of relatively soft members, and then more rigid structural members start deforming. On the other hand, it is desirable for the passenger compartment not to deform to any substantial extent to protect the vehicle occupant from secondary impacts. The time history of a vehicle crash therefore includes an initial gradual rise in deceleration accounted for by the deformation of the readily deformable part, and a steady deceleration which is accounted for by the deformation of the more rigid structural members. Also, the seat belt has a certain slack and a property to elongate when a tension is applied thereto. Therefore, upon occurrence of a vehicle crash, the deceleration of the vehicle occupant starts after a certain time delay caused by the deformation of the readily deformable part of the vehicle body and the slack/elongation of the seat belt, and then rises sharply when the deformation stroke of the readily deformable part of the vehicle body is exhausted and the slack/elongation of the seat belt has been exhausted. This sharp rise in deceleration which may be considered as a secondary impact which the seat belt applies to the vehicle occupant typically exceeds the steady deceleration of the vehicle body (passenger compartment). Because the extent of the injury to the vehicle occupant is dictated by the maximum level of the deceleration of the vehicle occupant, it is desirable to reduce the maximum level of the deceleration of the vehicle occupant.

According to the present invention, the seat belt applies a sharply rising deceleration in an early phase of a vehicle crash, typically before a part of the vehicle body supporting the seat has reached a steady deceleration level or before a part of the vehicle body supporting the seat has started decelerating as a result of the vehicle crash, so that the subsequent sharp rise in the deceleration of the vehicle occupant beyond a tolerable limit can be controlled.

According to a preferred embodiment of the present invention, the seat belt is provided with a second end which is engaged by the seat, the system further comprising a seat rail for permitting a fore-and-aft movement of the seat, and a second power actuator for moving the seat rearward, the second power actuator being adapted to apply a rearward acceleration to the vehicle seat in an early phase of the vehicle crash according to a prescribed pattern. This arrangement allows the seat belt to be pulled at at least two ends, and this contributes to a rapid rise in the level of deceleration which the seat belt applies to the vehicle occupant. In this case, the sensor may be adapted to activate only one of the first and second power actuators when an intensity of the vehicle crash is below a certain level, and activate both of the first and second power actuators only when an intensity of the vehicle crash is above a certain level.

A rapid rise in the level of deceleration which the seat belt applies to the vehicle occupant can also be achieved if the power actuator is interposed between the seat belt end which may consist of a shoulder anchor and the fixed part of the vehicle body via a mechanism for enlarging a displacement of the power actuator.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
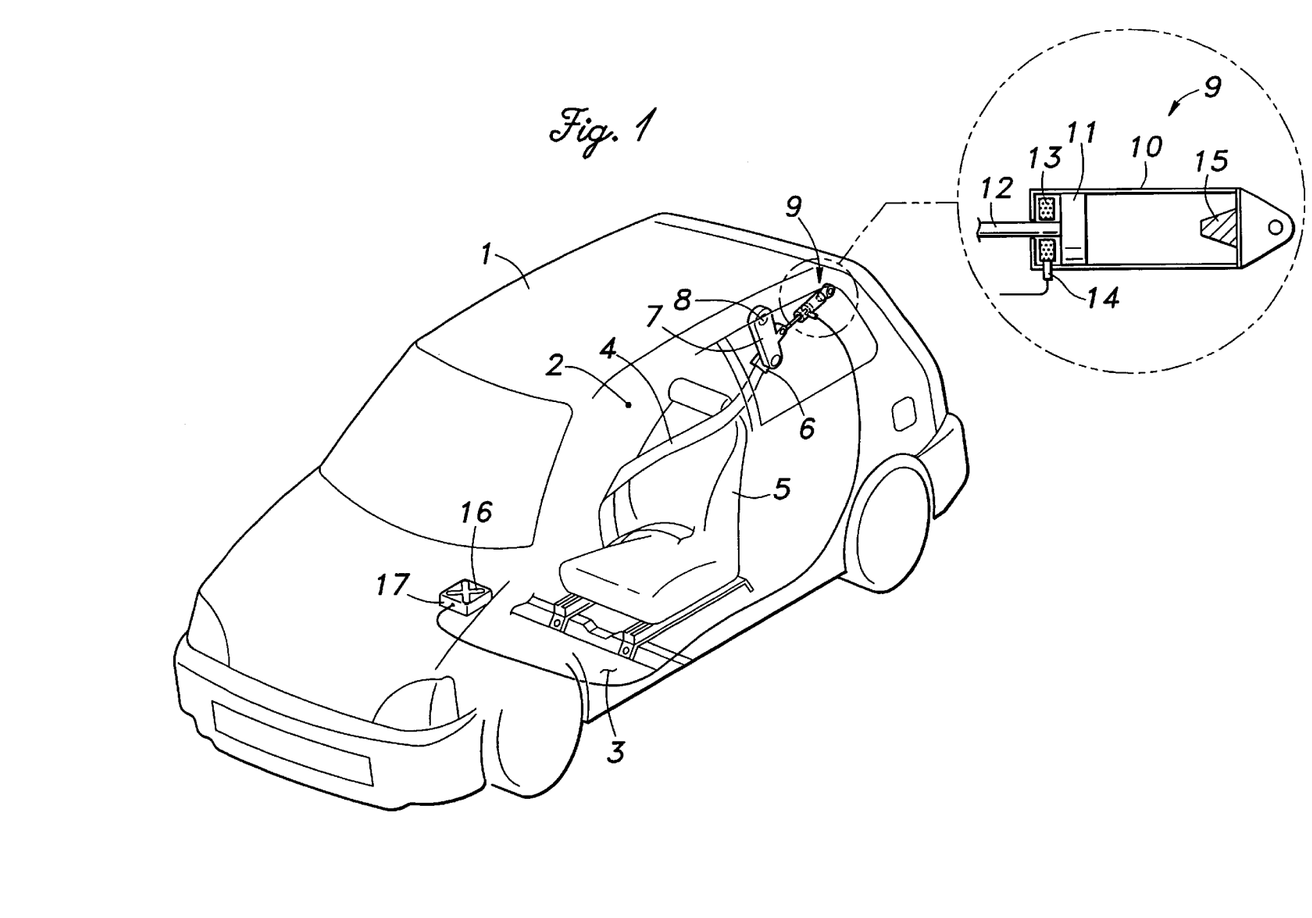
FIG. 1 is a perspective view illustrating a vehicle body fitted with a vehicle occupant protection system embodying the present invention.

FIG. 1 shows a vehicle body 1 fitted with a vehicle occupant protection system embodying the present invention. In a passenger compartment 2 of this vehicle body 1, a seat 5 is placed on a floor 3 via a conventional seat slide adjustment arrangement. A seat belt 4 is provided in association with this seat 5. The seat belt 4 comprises a lower anchor (see FIGS. 2a to 2c) which is attached to the outer side of the seat 5, a tongue plate (not shown in the drawing) fitted on an intermediate part of the seat belt (in a per se conventional manner), and an upper end or a shoulder anchor 6 attached to an upper part of the vehicle body 1 on the outer side of the seat 5 via a power actuator arrangement which is described hereinafter. A buckle (not shown in the drawing) is attached to the inner side of the seat 5 and is adapted to detachably latch the tongue plate. Therefore, the part of the seat belt 4 extending between the shoulder anchor 6 and tongue plate restrains the chest of the vehicle occupant and the part of the seat belt 4 extending between the lower anchor and tongue plate restrains the waist or pelvis of the vehicle occupant.

The shoulder anchor 6 is attached to a lower end of a swing arm 7 having an upper end (pivot point 8) pivotally attached to a fixed part of the vehicle body. An intermediate point of the swing arm 7 is also pivotally connected to a working end of a power actuator 9 attached to an upper part of the vehicle body 1.

The power actuator 9 comprises a cylinder 10 which is pivotally attached to a fixed part of the vehicle body 1, a piston 11 slidably received in the cylinder 10, and a piston rod 12 extending out of the end of the cylinder 10 opposite from the pivotally attached end thereof. The piston 11 is normally located near the piston rod end of the cylinder 10, and a propellant 13 is placed between the piston rod end of the cylinder 10 and the piston 11. The pivotally attached end of the cylinder 10 is internally provided with a stopper 15 which is made of an energy absorbing member such as a honeycomb member, and can decelerate the piston 11 according to a prescribed deceleration pattern when the propellant 13 is ignited and the piston 11 hits this stopper 15. The stopper 15 typically undergoes a controlled plastic deformation for bringing the piston 11 to a stop according to a prescribed deceleration pattern. The working end or free end of the piston rod 12 is pivotally attached to an intermediate point of the swing arm 7 as described earlier.

The propellant 13 is provided with an igniter 14 which is connected to a control unit 17 incorporated with a sensor 16, and is ignited when a prescribed impact is detected by the sensor 16 and an ignition signal is received from the control unit 17. The electronic control unit 17 activates the igniter 14 and, hence, the power actuator 9 according to the signal from the sensor 16 at the time of a vehicle crash.

The mode of operation of the present invention is described in the following with reference to FIGS. 2a to 2c and 3 when the vehicle has crashed onto a building, an oncoming vehicle or the like.

Figure 2A:
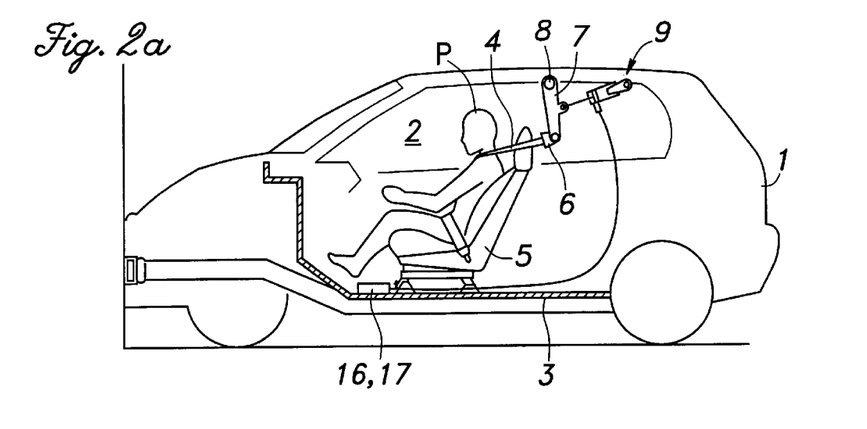
FIGS. 2a to 2c are side views showing different stages of the operation of the vehicle occupant protection system shown in FIG. 1.

FIG. 2a shows an initial stage immediately following the occurrence of a vehicle crash. The crash is detected by the sensor 16, and the control unit 17 activates the power actuator 9 accordingly, inevitably with a certain time delay. As a result, the piston 11 rapidly moves rearward inside the cylinder 10, and causes the swing arm 7 to rotate around the pivot point 8. The resulting rearward movement of the shoulder anchor 6 causes the seat belt 4 to apply a rearward acceleration or a deceleration to the vehicle occupant P which is greater than and rises more sharply than the deceleration of the part of the vehicle body defining the passenger compartment 2.

It should be noted that the swing arm 7 magnifies the movement of the piston rod 12 at a prescribed lever ratio, and this contributes to the rapidity of the rearward movement and the intensity of the rearward acceleration of the seat belt 4. Also, because the seat belt 4 typically elongates, particularly when an extreme tension is applied for the first time, the movement of the shoulder anchor 6 must be such that a rearward acceleration or a deceleration is applied to the vehicle occupant which is greater than and rises more sharply than the deceleration of the part of the vehicle body defining the passenger compartment 2.

Immediately following the occurrence of the crash and before the power actuator 9 is activated, the vehicle occupant P is thrown forward from the seat 5. But, once the power actuator 9 is activated, the vehicle occupant P is subjected to an added deceleration because the occupant P is positively pulled back by the tensioning of the seat belt 4 on top of the normal deceleration which is transmitted to the vehicle occupant P via the seat 5 and the associated part of the seat belt 4.

Figure 3:
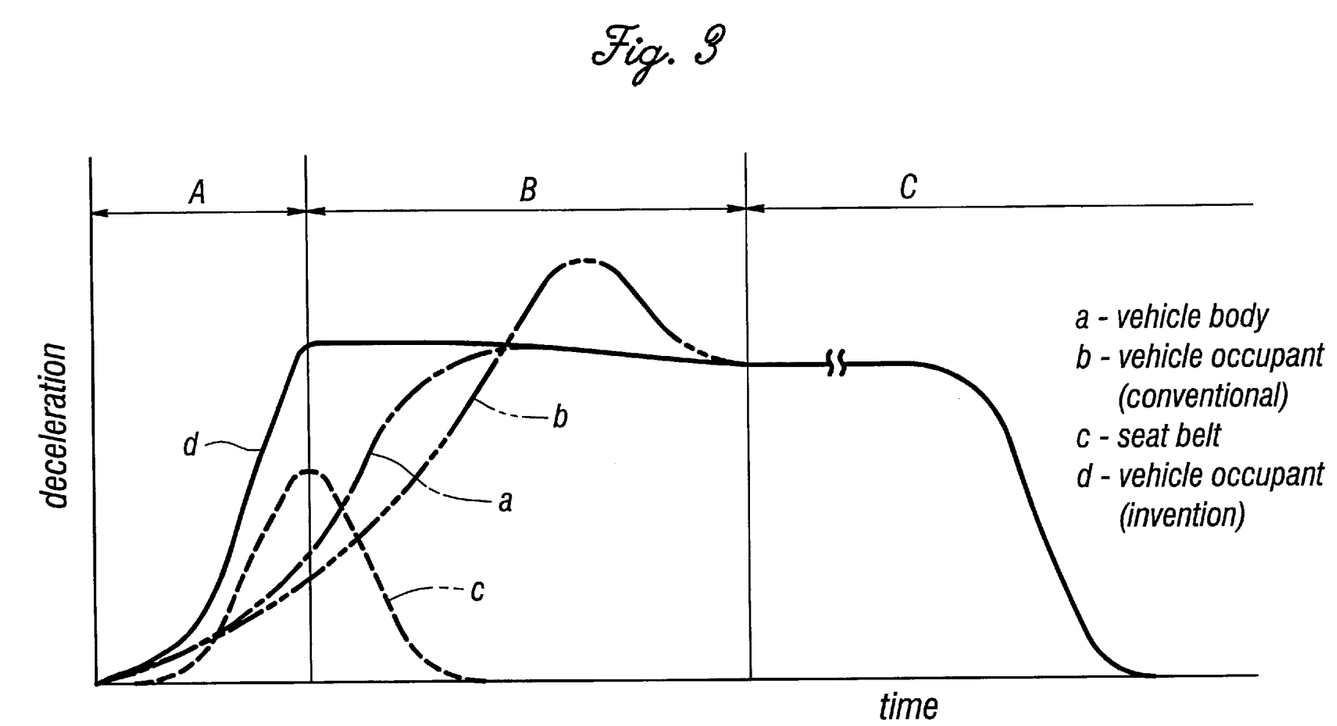
FIG. 3 is a graph showing the time history of acceleration of the various parts of the vehicle.

In the graph of FIG. 3, in the interval A, the deceleration level of the vehicle body (passenger compartment) is relatively small because of the crushing of the front part of the vehicle body which is relatively readily deformable. However, the seat belt 4 is positively tensioned, and this provides a sharply increasing deceleration to the vehicle occupant P from an early stage of the vehicle crash. The deceleration of the vehicle occupant P is given as a sum of the deceleration of the seat belt 4 and the deceleration of the vehicle body (passenger compartment).

Figure 2B:
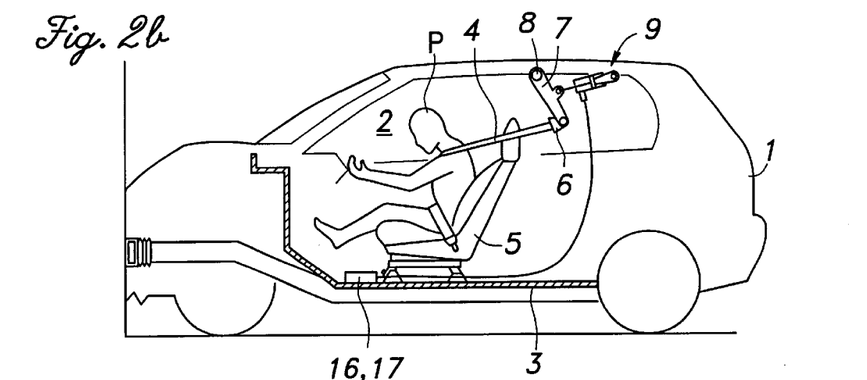

FIG. 2b shows an intermediate stage of the vehicle crash. The piston 11 continues to move rearward inside the cylinder 10 until it collides with the stopper 15. This decelerates the movement of the piston 11 inside the cylinder 10, and controls the deceleration acting on the vehicle occupant P from increasing beyond a prescribed level which may be defined as a maximum tolerable level of deceleration. In particular, the deceleration level of the vehicle occupant P relatively quickly rises to a steady level before the vehicle body (passenger compartment) does so (see the interval B of FIG. 3). Under this condition, the elongation of the seat belt 4 has been entirely absorbed, and the rearward load applied to the vehicle occupant P by the seat belt 4 gradually diminishes as the stopper 15 deforms with a result that the deceleration of the vehicle occupant P approaches the steady level. On the other hand, according to the conventional arrangement, the deceleration of the vehicle occupant P starts at a relatively late stage, and inevitably rises to an unacceptably high level before reaching the steady level.

Figure 2C:
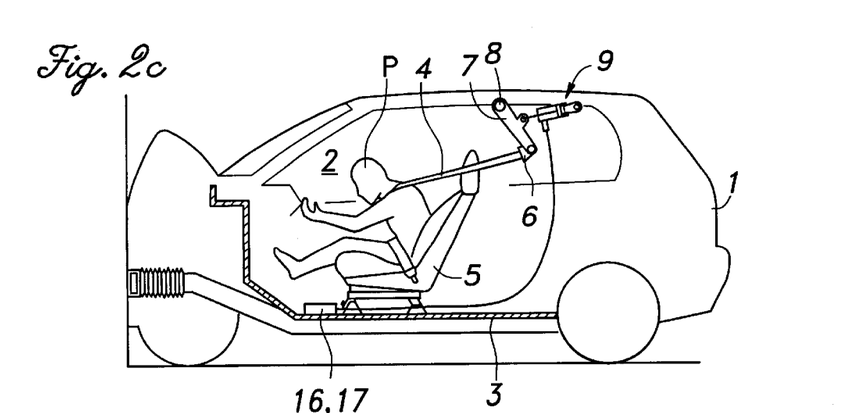

FIG. 2c shows a final stage of the vehicle crash. Once the deformation stroke of the stopper 15 has been exhausted, and the piston 11 reaches the bottom of the cylinder 10, there is no more relative movement and hence no relative deceleration between the piston 11 and the cylinder 10. Therefore, the seat 5 is subjected to a substantially same deceleration as the vehicle body 1. By determining the property of the seat belt 4 and the distance between the piston 11 and stopper 15 in the cylinder 10 in such a manner that the velocity and deceleration of the vehicle occupant P agree with those of the vehicle body 1 upon completion of the relative movement between the seat belt 4 and vehicle body 1, the vehicle occupant P and the vehicle body 1 can be made to decelerate substantially in a single body (see the interval C in FIG. 3), and this state continues until the vehicle comes to a stop.

The present invention may also be implemented by using a conventional pretensioner device to provide a desired deceleration pattern. The conventional pretensioner device is designed simply to remove a slack from the seat belt, but may be used to achieve the goal of the present invention by being given with a function to pull the seat belt according to a prescribed pattern. If desired, the fixed part of the vehicle body for attaching the actuator may consist of a part of the seat.

Figure 4:
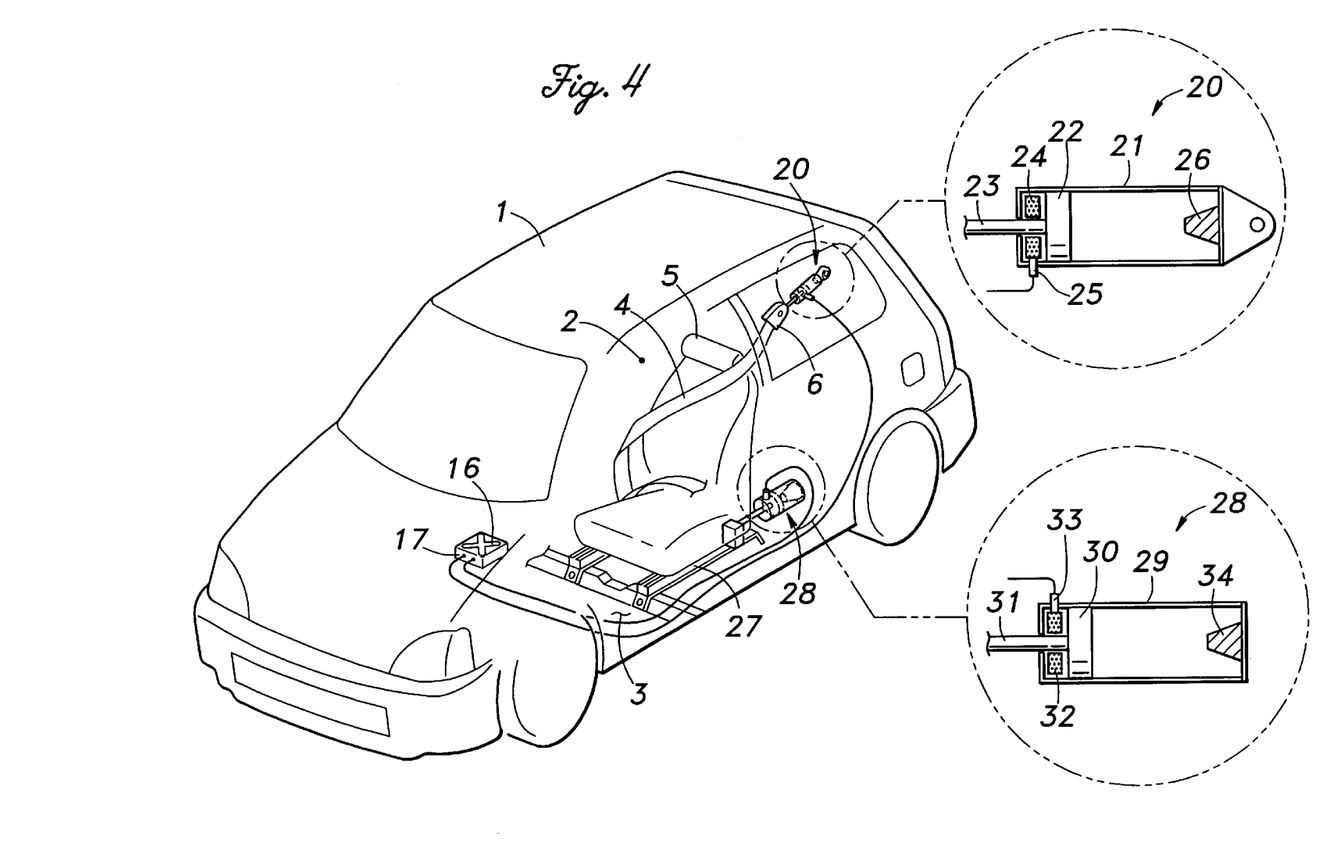
FIG. 4 is a view similar to FIG. 1 showing a second embodiment of the present invention.

FIG. 4 shows a second embodiment of the present invention. The parts corresponding to those of the previous embodiment are denoted with like numerals without repeating the description of such parts. In this embodiment, the shoulder anchor 6 of the seat belt 4 is directly attached to a working end of a first power actuator 20. This first power actuator 20 is similar to that of the power actuator 9 of the previous embodiment, and comprises a cylinder 21 which is fixedly attached to a fixed part of the vehicle body 1, a piston 22 slidably received in the cylinder 21, and a piston rod 23 extending out of an end of the cylinder 21. The piston 21 is normally located near the piston rod end of the cylinder 21, and a propellant 24 is placed between the piston rod end of the cylinder 21 and the piston 22. The end of the cylinder 21 opposite from the piston rod end thereof is provided with a stopper 26 which is made of an energy absorbing member such as a honeycomb member, and can decelerate the piston 22 according to a prescribed deceleration pattern when the propellant 24 is ignited and the piston 22 hits this stopper 26. The stopper 26 typically undergoes a controlled plastic deformation for bringing the piston 22 to a stop according to a prescribed deceleration pattern. The working end or free end of the piston rod 23 is attached to the shoulder anchor 6 as mentioned earlier.

The seat 4 is supported on the floor 3 via a seat slide arrangement 27 for permitting a fore-and-aft movement of the seat 5. A second power actuator 28 is fixedly attached to the floor 3, and a working end thereof is connected to the seat 5. The second power actuator 28 is similar to that of the first power actuator 20, and comprises a cylinder 29 which is fixedly attached to the floor 3, a piston 30 slidably received in the cylinder 29, and a piston rod 31 extending out of an end of the cylinder 29. The piston 30 is normally located near the piston rod end of the cylinder 29, and a propellant 32 is placed between the piston rod end of the cylinder 29 and the piston 30. The end of the cylinder 29 opposite from the piston rod end thereof is provided with a stopper 34 which is made of an energy absorbing member such as a honeycomb member, and can decelerate the piston according to a prescribed deceleration pattern when the propellant is ignited and the piston hits this stopper 34. The stopper 34 typically undergoes a controlled plastic deformation for bringing the piston 30 to a stop according to a prescribed deceleration pattern. The working end or free end of the piston rod 31 is attached to the seat 5 as mentioned earlier.

A sensor 16 is provided on the vehicle body 1 for detecting a vehicle crash. The output of the sensor 16 is connected to an electronic control unit 17 which selectively activates the actuators 20 and 28 according to a signal from the sensor 16 at the time of a vehicle crash. The output of the electronic control unit 17 is connected to the igniters 25 and 33 of the first and second actuators 20 and 28.

The mode of operation of this embodiment is described in the following with reference to FIGS. 5a to 5c when the vehicle has crashed onto a building, an oncoming vehicle or the like.

Figure 5A:
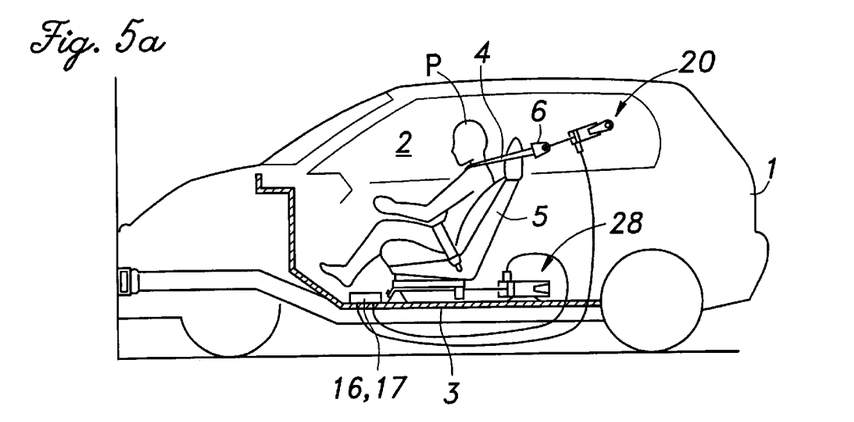
FIGS. 5a to 5c are views similar to FIGS. 2a to 2c showing different stages of the operation of the vehicle occupant protection system shown in FIG. 4.

FIG. 5a shows an initial stage immediately following the occurrence of a vehicle crash. The crash is detected by the sensor, and the control unit 17 activates the first and second power actuators 20 and 28 accordingly, inevitably with a certain time delay. As a result, the piston 22 of the first power actuator 20 rapidly moves rearward inside the cylinder 21, and causes the seat belt 4 to apply a rearward acceleration or a deceleration to the vehicle occupant P. At the same time, the second power actuator 28 is activated and pulls the seat 5 along with the buckle and the lower anchor of the seat belt 4 rearward, and this additionally causes the seat belt 4 to apply a rearward acceleration or a deceleration to the vehicle occupant P. The resulting deceleration of the vehicle occupant P is greater than and rises more sharply than the deceleration of the part of the vehicle body defining the passenger compartment 2.

Because the seat belt 4 typically elongates, particularly when an extreme tension is applied for the first time, the movement of the seat belt 4 must be such that a rearward acceleration or a deceleration applied to the vehicle occupant P is greater than and rises more sharply than the deceleration of the part of the vehicle body defining the passenger compartment 2. Because the vehicle occupant P, along with the seat 5 is pulled rearward, an additional space is created in front of the vehicle occupant P, and this increases the tolerable deformation of the front part of the vehicle. This is particularly advantageous in a small car where the deformation stroke permitted to the vehicle body at the time of a vehicle crash is relatively limited.

Immediately following the occurrence of the crash and before the power actuators 20 and 28 are activated, the vehicle occupant P is thrown forward from the seat 5. But, once the power actuators 20 and 28 are activated, the vehicle occupant P is subjected to an added deceleration because the vehicle occupant P is positively pulled back by the tensioning of the seat belt 4 on top of the normal deceleration which is transmitted to the vehicle occupant P via the seat 5 and the associated part of the seat belt 4.

The deceleration level of the vehicle body (passenger compartment) is relatively small in an initial stage of a vehicle crash because of the crushing of the readily deformable front part of the vehicle body. However, the seat belt 4 is positively tensioned, and this provides a sharply increasing deceleration to the vehicle occupant P from an early stage of the vehicle crash. The deceleration of the vehicle occupant P is given as a sum of the deceleration of the seat belt 4 and the deceleration of the vehicle body (passenger compartment).

Figure 5B:
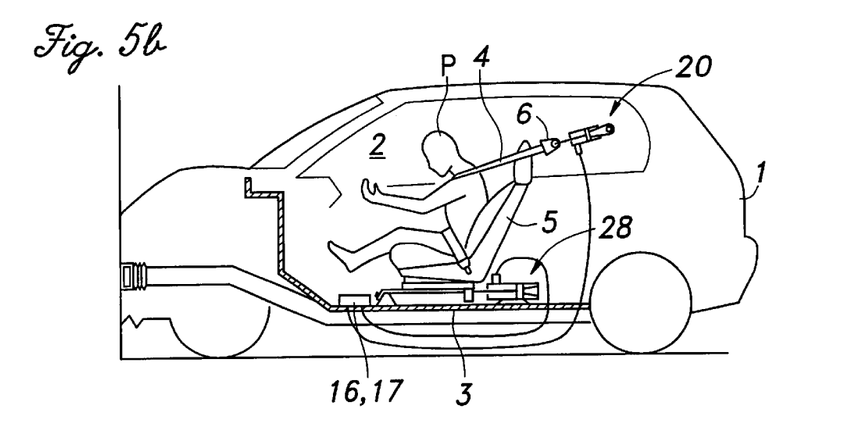

FIG. 5b shows an intermediate stage of the vehicle crash. The pistons 22 and 30 continue to move rearward inside the cylinders 21 and 29 until they collide with the stoppers 26 and 34. This decelerates the movement of the pistons 22 and 30 inside the cylinders 21 and 29, and controls the deceleration acting on the vehicle occupant from increasing beyond a prescribed level which may be defined as a maximum tolerable level of deceleration. In particular, the deceleration level of the vehicle occupant P relatively quickly rises to a steady level before the vehicle body (passenger compartment) does so in the intermediate stage of the vehicle crash. Under this condition, the elongation of the seat belt 4 has been entirely absorbed, and the rearward load applied to the vehicle occupant P by the seat belt 4 gradually diminishes as the stoppers 26 and 34 deform with a result that the deceleration of the vehicle occupant P approaches the steady level. On the other hand, according to the conventional arrangement, the deceleration of the vehicle occupant P starts at a relatively late stage, and inevitably rises beyond an acceptable level before reaching the steady level.

Figure 5C:
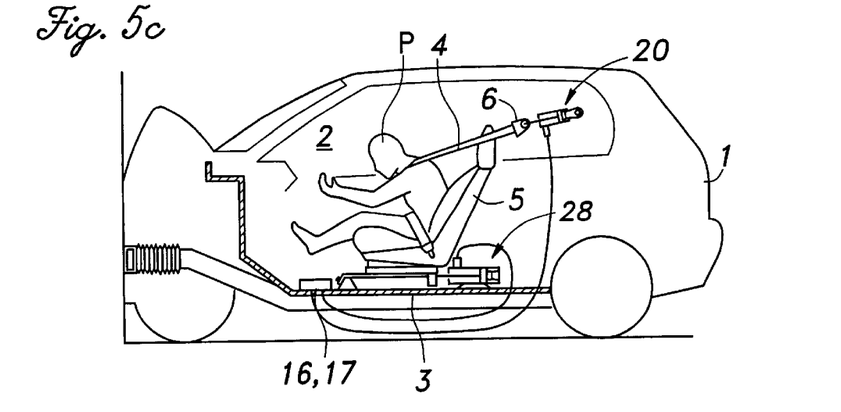

FIG. 5c shows a final stage of the vehicle crash. Once the deformation stroke of the stoppers 26 and 34 has been exhausted, and the pistons 22 and 30 reach the bottom of the cylinders 21 and 29, there is no more relative movement and hence no relative deceleration between the pistons 22 and 30 and the cylinders 21 and 29. Therefore, the seat 5 is subjected to a substantially same deceleration as the vehicle body 1. By determining the property of the seat belt and the distance between the piston and stopper in each of the cylinders in such a manner that the velocity and deceleration of the vehicle occupant agree with those of the vehicle body 1 upon completion of the relative movement between the seat belt 4 and vehicle body 1, the vehicle occupant P and the vehicle body 1 can be made to decelerate substantially in a single body, and this state continues until the vehicle comes to a stop.

In case of an intense crash, the deceleration produced in the vehicle body 1 is intense accordingly. In particular, the more intense the crash is, the more sharply the deceleration of the vehicle occupant is required to be increased so that the deceleration of the vehicle occupant may match the deceleration of the vehicle body. In such a case, both the first and second actuators 20 and 28 are activated.

When the vehicle crash is not intense and the deceleration produced in the vehicle body is relatively small, the rise in the deceleration of the vehicle occupant is only required to reach a relatively low level to balance the deceleration of the vehicle body with that of the vehicle occupant P. In such a case, the deceleration of the vehicle body can be matched with that of the vehicle occupant P by activating only one of the power actuators.

As can be appreciated from the foregoing description, by producing a deceleration higher than that of the average vehicle body deceleration in the seat belt for a short period of time in an initial phase of the vehicle crash, reducing the acceleration or the deceleration in the seat belt in an intermediate phase of the vehicle crash, and then allowing the vehicle occupant and seat belt to decelerate at the same rate as the average vehicle body deceleration, the vehicle occupant can be decelerated without experiencing any excessive level of deceleration.

According to the present invention, a favorable deceleration pattern for controlling the deceleration of the vehicle occupant can be produced in the seat belt so that the maximum deceleration level of the vehicle occupant can be effectively reduced even when the amount of deformation of the vehicle body is relatively small. Also, because the displacement of the vehicle occupant within the passenger compartment (relative to the vehicle body) can be reduced, and this contributes to the minimization of the secondary impact to the vehicle occupant.

Also, if the seat belt can be pulled rearward at both the upper part thereof adjacent to the shoulder of the vehicle occupant and the part adjacent to the seat, an improved action can be produced even when the available space is limited as compared to the case where the seat belt is pulled only at one point.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle occupant protection system, comprising:
   a seat for seating a vehicle occupant in a passenger compartment of a vehicle body;
   a seat belt provided in association with said seat for restraining a vehicle occupant seated in said seat;
   a first power actuator interposed between an end of said seat belt and a fixed part of said vehicle body and adapted to pull said seat belt in a direction to increase a restraint on said vehicle occupant;
   a seat rail for permitting a fore-and-aft movement of said seat:
   a second power actuator adapted to move said seat rearward: and
   a sensor for providing an activation signal to said first and second power actuators upon detection of a vehicle crash;
   wherein said first power actuator is adapted, when a vehicle crash is detected, to apply a rearward acceleration to said seat belt end in an early phase of said vehicle crash according to a prescribed pattern, and said second power actuator is adapted, when a vehicle crash is detected, to apply a rearward acceleration to said vehicle seat in an early phase of said vehicle crash;

said prescribed pattern including an initial crash stage for moving said seat belt rearward at a deceleration which is earlier and greater than a deceleration produced in said vehicle body, and an intermediate crash stage for controlling said rearward movement of said seat belt so as to substantially equalize the deceleration acting on said vehicle occupant with the deceleration acting on said vehicle body.

2. A vehicle occupant protection system according to claim 1, wherein said pattern is defined in such a manner that a rearward acceleration is applied to said vehicle occupant by said first power actuator following the detection of said crash and before a part of said vehicle body supporting said seat has reached a steady deceleration level.

3. A vehicle occupant protection system according to claim 1, wherein said pattern is defined in such a manner that a rearward acceleration is applied to said vehicle occupant by said first power actuator following the detection of said crash and substantially before a part of said vehicle body supporting said seat has started decelerating as a result of said vehicle crash.

4. A vehicle occupant protection system according to claim 1, wherein said first power actuator is interposed between said seat belt end and said fixed part of said vehicle body via a mechanism for enlarging a displacement of said first power actuator.

5. A vehicle occupant protection system according to claim 4, wherein said seat belt end comprises a shoulder anchor of said seat belt.

6. A vehicle occupant protection system, comprising:

a seat for seating a vehicle occupant in a Passenger compartment of a vehicle body;

a seat belt provided in association with said seat for restraining a vehicle occupant seated in said seat, wherein said seat belt is provided with a second end which is engaged by said seat;

a seat rail for permitting a fore-and-aft movement of said seat;

a first power actuator interposed between an end of said seat belt and a fixed part of said vehicle body and adapted to null said seat belt in a direction to increase a restraint on said vehicle occupant;

a second power actuator for moving said seat rearward, said second power actuator being adapted to apply a rearward acceleration to said vehicle seat in an early phase of said vehicle crash according to a prescribed pattern; and a sensor for providing an activation signal to said first power actuator upon detection of a vehicle crash;

wherein said first power actuator is adapted, when a vehicle crash is detected, to apply a rearward acceleration to said seat belt end in an early phase of said vehicle crash according to a prescribed pattern;

said prescribed pattern including an initial crash stage for moving said seat belt rearward at a deceleration which is earlier and greater than a deceleration produced in said vehicle body, and an intermediate crash stage for controlling said rearward movement of said seat belt so as to substantially equalize the deceleration acting on said vehicle occupant with the deceleration acting on said vehicle body; and wherein said sensor is adapted to activate only one of said first and second power actuators when an intensity of said vehicle crash is below a certain level, and activate both of said first and second power actuators when an intensity of said vehicle crash is above a certain level.

7. A vehicle occupant protection system, comprising:

a seat for seating a vehicle occupant in a passenger compartment of a vehicle body;

a seat belt provided in association with said seat for restraining a vehicle occupant seated in said seat, said seat being provided with a first end which is engaged by said seat;

a first power actuator interposed between a second end of said seat belt and a fixed part of said vehicle body and adapted to pull said seat belt in a direction to increase a restraint on said vehicle occupant, said first power actuator being adapted, when a vehicle crash is detected, to apply a rearward acceleration to said second end in an early phase of said vehicle crash according to a prescribed pattern;

a seat rail permitting a fore-and-aft movement of said seat;

a second power actuator for moving said seat rearward, said second power actuator being adapted to apply a rearward acceleration to said vehicle seat in an early phase of said vehicle crash according to a prescribed pattern; and a sensor for providing an activation signal to said first and second power actuators upon detection of a vehicle crash, said sensor being adapted to activate only one of said first and second power actuators when an intensity of said vehicle crash is below a certain level, and activate both of said first and second power actuators when an intensity of said vehicle crash is above a certain level.

8. A vehicle occupant protection system according to claim 7, wherein at least one of said prescribed patterns is defined in such a manner that a rearward acceleration is applied to said vehicle occupant by the corresponding power actuator following the detection of said crash and before a part of said vehicle body supporting said seat has reached a steady state deceleration level.

9. A vehicle occupant protection system according to claim 7, wherein at least one of said patterns is defined in such a manner that a rearward acceleration is applied to said vehicle occupant by the corresponding power actuator following the detection of said crash and substantially before a part of said vehicle body supporting said seat has started decelerating as a result of said vehicle crash.

10. A vehicle occupant protection system according to claim 7, wherein said prescribed pattern for said first power actuator includes an initial crash stage for moving said seat belt rearward at a deceleration which is earlier and greater than a deceleration produced in said vehicle body, and an intermediate crash stage for controlling said rearward movement of said seat belt so as to substantially equalize the deceleration acting on said vehicle occupant with the deceleration acting on said vehicle body.

11. A vehicle occupant protection system according to claim 7, wherein said first power actuator is interposed between said second end of said seat belt and said fixed part of said vehicle body via a mechanism for enlarging a displacement of said first power actuator.

12. A vehicle occupant protection system according to claim 11, wherein said second end of said seat belt comprises a shoulder anchor of said seat belt.

* * * * *